(12) United States Patent
Cannell et al.

(10) Patent No.: US 9,718,652 B2
(45) Date of Patent: Aug. 1, 2017

(54) PASSIVE HEAVE COMPENSATOR (71) Applicant: TECHNIP FRANCE, Courbevoie (FR)

(72) Inventors: David Cannell, Culsalmond (GB); Christophe Labbe, Rio de Janeiro (BR); Eric Odigie, Aberdeen (GB); Shaun Riddell, Aberdeen (GB)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/766,230

(22) PCT Filed: Feb. 5, 2014

(86) PCT No.: PCT/IB2014/000172
§ 371 (c)(1),
(2) Date: Aug. 6, 2015

(87) PCT Pub. No.: WO2014/122527
PCT Pub. Date: Aug. 14, 2014

(65) Prior Publication Data
US 2016/0002012 A1 Jan. 7, 2016

(30) Foreign Application Priority Data
Feb. 7, 2013 (GB) .................................. 1302151.4

(51) Int. Cl.
*E21B 19/00* (2006.01)
*B66C 23/53* (2006.01)
(Continued)

(52) U.S. Cl.
CPC .............. *B66C 23/53* (2013.01); *B63B 39/03* (2013.01); *B66C 13/02* (2013.01); *B66C 13/06* (2013.01);
(Continued)

(58) Field of Classification Search
CPC ............................. B66C 23/53; E21B 19/006
See application file for complete search history.

(56) References Cited

U.S. PATENT DOCUMENTS 3,158,208 A 11/1964 Kammerer ...................... 175/27
3,912,227 A 10/1975 Meeker et al. ................ 254/172
(Continued)

FOREIGN PATENT DOCUMENTS

EP 1 908 985 A1 4/2008
WO WO 2007/145503 12/2007

OTHER PUBLICATIONS

International Search Report dated Mar. 23, 2015 issued in corresponding International patent application No. PCT/IB2014/000172.
(Continued)

*Primary Examiner* — Matthew R Buck
*Assistant Examiner* — Aaron Lembo
(74) *Attorney, Agent, or Firm* — Ostrolenk Faber LLP (57) ABSTRACT

A passive heave compensator comprising: a main hydraulic cylinder, including a moveable piston having a piston rod extendible through the main hydraulic cylinder and a piston head, a gas phase above the piston head, and at least one oil phase below the piston head separated by a boundary; an upper connection point associated with the main hydraulic cylinder and a lower connection point associated with the piston rod; and at least one accumulator, the or each accumulator having a moveable separator to divide the accumulator between a gas phase above the separator, and an oil phase below the separator, and the or each oil phase being in communication with an oil phase in the main hydraulic cylinder; characterized in that the main hydraulic cylinder further comprises a cylinder sleeve co-axial with the piston head to provide, in co-ordination with the piston head, the boundary between the gas phase and the at least one oil phase in the main hydraulic cylinder. In this way, the
(Continued)

variation in the coordination between the shape, longitudinal position, or both of the piston head, which naturally must be smaller in cross-section than the cross-section of the main hydraulic cylinder, and the transverse extent of the cylinder sleeve, provides variation in the cross-sectional area of oil volume in the main hydraulic cylinder, and thus different damping effects along the length of the main hydraulic cylinder, which are available to the user.

17 Claims, 4 Drawing Sheets

(51) Int. Cl.
*B63B 39/03* (2006.01)
*B66D 1/52* (2006.01)
*F16F 9/06* (2006.01)
*B66C 13/06* (2006.01)
*B66C 13/02* (2006.01)

(52) U.S. Cl.
CPC .............. *B66D 1/52* (2013.01); *E21B 19/006* (2013.01); *F16F 9/065* (2013.01)

(56) References Cited

U.S. PATENT DOCUMENTS

| | | | |
|---|---|---|---|
| 4,659,530 A | * | 4/1987 | Boyers ................. B29C 43/021 |
| | | | 264/314 |
| 7,934,561 B2 | | 5/2011 | Ormond |
| 2005/0074296 A1 | | 4/2005 | McCarty et al. |
| 2005/0077049 A1 | | 4/2005 | Moe et al. |

OTHER PUBLICATIONS

International Preliminary Report on Patentability issued in PCT International Application No. PCT/IB2014/000172 dated Aug. 11, 2015.

UKIPO Search Report issued in UK Patent Application No. 1302151.4 (now granted as UK Patent No. 2503063B) dated May 28, 2013.

"Cranemaster Technology." Cranemaster Technology—Passive Heave Compensation—Shock Absorber. Accessed Dec. 20, 2012. <http://cranemaster.no/technology/technology.html>.

* cited by examiner

PASSIVE HEAVE COMPENSATOR

CROSS REFERENCE TO RELATED APPLICATIONS

The present application is a 35 U.S.C. §371 National Phase conversion of PCT/IB2014/000172, filed Feb. 5, 2014, claiming the benefit of United Kingdom Application no. 1302151.4, filed Feb. 7, 2013, the disclosure of which is incorporated herein by reference. The PCT International Application was published in the English language.

TECHNICAL FIELD OF THE INVENTION

The present invention relates to a passive heave compensator, and a method of providing compensation, particularly for offshore use.

BACKGROUND OF THE INVENTION

In general, offshore passive heave compensators are designed to reduce the impact of significant load variations that are possible during offshore heavy lifting or transfer, generally due to the variable motions of either the lifting point or the load, or indeed both. Such compensators can reduce the dynamic forces in the lifting wire or host wire caused by the motion of the sea from or on the load, to the lifting point. They use a mixture of hydraulics and pneumatic dampers to help compensate for such load variations. Their uses include the transfer or lifting of loads: between static points and floating vessels, between floating vessels, or offloading units from such vessels; as well as in various subsea operations such as lowering units to a sea bed, and in 'overload protection' in subsea environments.

U.S. Pat. No. 7,934,561 B2 discloses a subsea passive heave compensator as an 'in line tool' that uses the principles of spring isolation to generate a net heave compensation effect or spring isolation effect. The unit is a 'nitrogen over oil' spring dampening device, and its invention uses 'pressure balancing' to mitigate/eliminate the effect that hydrostatic pressure has on such units when used in deeper water.

Ernst-B. Johansen a.s. supply units under the trade mark 'Cranemaster' (www.cranemaster.no) as passive heave compensating systems, which are self-contained hydraulic/pneumatic units charged with an internal gas pressure and oil volume. The Cranemaster units are able to absorb peak loads: such as for example a transfer lift between a supply vessel and a rig, or at splash zones, when items with large surface areas are lowered through the splash zone.

The Cranemaster units generally have a different preset "point of stroke" (i.e. the load at which the piston will start to extend, achieved by adjusting the pretension pressures etc.), depending on their use. For example, where a Cranemaster unit is used in a splash zone or for subsea lifts, the Cranemaster is normally pre-set so that the piston rod initially extends to about ⅔ of its length when in air, and retracts to about ⅓ of its length when submerged. Above water, the Cranemaster unit is free cycle, responding to its surroundings and catching slack wire when being in line to lift a load through a splash zone. When the load is fully submerged, the unit then acts as a passive heave compensator to reduce the vertical displacement and thus landing speed of the load. When working mainly as a subsea heave compensator, the unit is instead pre-set to cycle about ⅓ to ½ of its full stroke. This leaves the load in a more stable state as the unit absorbs motion and vibrations transmitted by the wire. As the load being installed will be exposed to less dynamic motion, it is possible to control the vertical displacement and landing speed, and thereby provide a safer installation.

For transfer lifts between vessels, the unit can be preset to absorb peak loads due to the vessel's motion in the waves relative to a rig.

The Cranemaster unit can also be pre-set to reduce or avoid resonance.

For retrieving objects from the sea bed, the Cranemaster unit can be pre-set to initially be at a zero stroke. Thus, when used for retrieving subsea structures, the unit is able to take up the vessel's motion 'topside' on the surface, and protect the crane from overload. The unit uses its spring force provided by the pre-set gas pressure to ensure a controlled retrieval of the subsea equipment from its installed position. As the crane starts lifting, the increased tension in the crane wire makes the unit extend until the tension of the crane wire exceeds the force necessary for pulling the object out of the seabed. Once lifted, the unit can ensure a controlled retraction, catching up slack wire and acting as a passive heave compensator as the load is lifted towards the surface.

However, the Cranemaster units cannot be changed from their pre-set compensation during operation, and they are only efficient when operating in the conditions that they were tuned for. They are distinctly less effective when used for different uses, and they cannot be pressure-compensated for use at different depths. This becomes a more significant issue at very deep depths.

Figure 1:
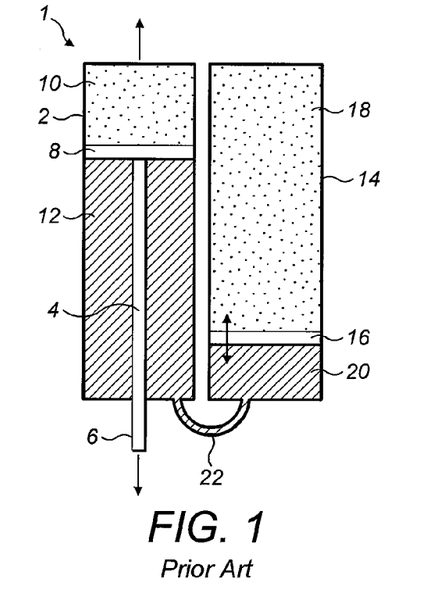
FIG. 1 is a cross-sectional schematic view of a prior art passive heave compensator.

FIG. 1 of the accompanying drawings shows a cross-sectional schematic view of an example of a prior art passive heave compensator 1 to illustrate this. The prior art compensator 1 has a main hydraulic cylinder 2 housing a moveable piston 4 and piston rod 6. The compensator 1 is generally in line with the lifting of a load, and thus has a 'top' and 'bottom' relative to the vessel or seabed etc. The top of the main hydraulic cylinder 2 has an upper connection point (not shown) to attach to a lifting wire or the like, and a load (not shown) is attached to the free end of the piston rod 6 using a lower connection point (not shown). The piston 4 has a piston head 8 which completely divides the main hydraulic cylinder 2 between a first compressed gas portion 10, and a first oil portion 12. Next to the main hydraulic cylinder 2 is an accumulator 14 having a moveable separator 16 dividing the accumulator volume into a second gas portion 18, and a second oil portion 20. The first and second oil portions 12, 20 are in communication via a passageway 22.

In use, the expected load and the loading limits for the intended use of the passive heave compensator are considered, and the volume and pressure of each of the gas and oil portions are calculated so as to provide the correct range of damping to the expected load or loading, based on an expected or desired displacement of the piston within the main hydraulic cylinder. In this way, the passive heave compensator is 'pre-tensioned' to the expected load variation or other load limitations.

However, as the passive heave compensator shown in FIG. 1 is a self-contained unit, the pressures and volumes of the gas and oil phases cannot be adjusted during operation. That is, the compensator is considered to be 'pre-set'. As such, a prior art compensator is not efficient when used in any different load conditions, or for significantly different loads, or even for different uses.

SUMMARY OF THE INVENTION

It is one object of the present to provide a passive heave compensator having a variable damping or load-compensation effect.

According to a first aspect of the present invention, there is provided a passive heave compensator comprising:
- a main hydraulic cylinder, including a moveable piston having a piston rod extendible through the main hydraulic cylinder and a piston head, a gas phase above the piston head, and at least one oil phase below the piston head separated by a boundary;
- an upper connection point associated with the main hydraulic cylinder and a lower connection point associated with the piston rod; and
- at least one accumulator, the or each accumulator having a moveable separator to divide the accumulator between a gas phase above the separator, and an oil phase below the separator, and the or each oil phase being in communication with an oil phase in the main hydraulic cylinder;
- characterized in that the main hydraulic cylinder further comprises a cylinder sleeve co-axial with the piston head to provide, in co-ordination with the piston head, the boundary between the gas phase and the at least one oil phase in the main hydraulic cylinder.

In this way, the variation in the coordination between the shape, longitudinal position, or both of the piston head, which naturally must be smaller in cross-section than the cross-section of the main hydraulic cylinder, and the transverse extent of the cylinder sleeve, provides variation in the cross-sectional area of oil volume in the main hydraulic cylinder, and thus different damping effects along the length of the main hydraulic cylinder, which are available to the user.

In another way, the cylinder sleeve and the piston head each provide a portion of the boundary, such that together they provide the boundary between the gas phase and at least one oil phase, optionally more than one oil phase. The boundary is the oil/gas boundary required by a passive heave compensator in order to operate. The portion of this boundary provided by the piston head will generally be the same wherever its position along the length of the main hydraulic cylinder, but the portion of the boundary provided by the cylinder sleeve may vary, depending upon the possible positions and variations of the coordination of the cylinder sleeve and piston head.

Optionally, the piston head does not extend to the inner wall of the main hydraulic cylinder, and the cylinder sleeve includes one or more side walls or flanges able to complete the distance between the piston head and the inner wall of the main hydraulic cylinder in order to create the required oil/gas boundary within the main hydraulic cylinder that provides the existence of the gas phase and the separable at least one oil phase.

Generally, there is at least one oil phase below at least a portion of the cylinder sleeve.

Optionally, the cylinder sleeve includes one or more flanges extending across or transverse the main hydraulic cylinder to provide at least a part of the boundary between the gas phase and at least one oil phase.

Optionally, the cylinder sleeve has one oil phase below it, and the piston head has the same or a different oil phase below it.

In general, the passive heave compensator provided by the present invention is able to provide variation of the cross-sectional area of the oil phase along the length of the main hydraulic cylinder following movement of at least the piston head, and/or the cylinder sleeve during passive heave compensation action.

In particular, by longitudinally dividing the main hydraulic cylinder using both a cylinder sleeve and the piston head, variation is possible concerning the cross-sectional area of the oil phase or phases along the length of the hydraulic cylinder, thus providing variation in the damping operation of the passive heave compensator.

Optionally, the cylinder sleeve is moveable longitudinally through or along the main hydraulic cylinder, or a portion of the cylinder sleeve is moveable, in the same way that the piston and piston head are moveable longitudinally through the main hydraulic cylinder.

Optionally, the cylinder sleeve is at least in part moveable in line with movement of the piston head. Such movement may be controlled or controllable, and occur at predetermined displacements of one or other of the cylinder sleeve and piston head, or other displacement relationships therein between, so as to provide a desired variable damping operation based on the load or loading applied to the piston head.

Optionally, the cylinder sleeve and piston head overlap longitudinally.

The use of a cylinder sleeve being co-axial with the piston head allows many variations in the parameters in the passive heave compensator, and thus variations in damping operations. For example, and without limitation, and optionally in combination;
- the provision of more than one oil phase in the main hydraulic cylinder, such oil phases optionally having different parameters such as different rheological properties, different pressures, etc.;
- the provision of more than one accumulator to provide the same or different pressure/damping effect on the oil phase or phases in the main hydraulic cylinder;
- the provision of differing displacements of the cylinder sleeve and piston head to provide different damping operations;
- the provision of different shapes of cylinder sleeve to provide variation in the cross-sectional area of the oil phase or phases along the length of the main hydraulic cylinder.

By way of example only, the cylinder sleeve could provide a cylinder housing for the piston head within the dimensions of the main hydraulic cylinder, forming a co-axial 'inner cylinder' for the piston head.

Independent displacement of the cylinder sleeve and piston head provides multi-step compensation in or by the compensator. Where the cylinder sleeve and piston head may also be displaced in co-ordination, this may provide a further different compensation in or by the compensator.

Other separate or combinable options and embodiments of the present invention include:
- wherein such main hydraulic cylinder has a first oil phase below the piston head and a second oil phase below the cylinder sleeve;
- wherein such first and second oil phases are in fluid communication;
- wherein the first and second oil phases are separate;
- wherein each oil phase and the main hydraulic cylinder is in fluid communication with a separate accumulator, optionally wherein each such accumulator provides a different compensation to the main hydraulic cylinder;
- wherein the piston head and cylinder sleeve have different displacements within the main hydraulic cylinder;
- wherein the cylinder sleeve and piston head are conjoinable, e.g. lockable, together to achieve co-ordinated movement when necessary or desired.

According to one embodiment of the present invention, the passive heave compensator has a cylinder sleeve with depending transverse longitudinal side walls forming an inner cylinder for the piston head, to provide a first oil phase below the piston head and a second oil phase defined by the cylinder sleeve side walls and inner wall of the main hydraulic cylinder.

Optionally, each oil phase is in fluid communication with the same accumulator, in which case this is optionally via separate passageways.

Alternatively, each oil phase is in fluid communication with a separate accumulator, which separate accumulators may have the same or difference parameters, especially gas phase volume, pressure or both.

Such an embodiment may be used such that only the piston head is moveable within the inner cylinder. In this way, the passive heave compensator can be designed to support fewer/smaller loads or loading, whilst still providing the required/length of the piston rod beyond the main hydraulic cylinder.

Alternatively, such an embodiment may be used wherein the cylinder sleeve and piston head are conjoined such that both oil phases are compressed in coordination following loading on the piston, which produces a heavier damping system such that it is able to support more/higher loads, for the same or similar piston/length.

Further alternatively, such embodiment may be used wherein the first displacement is movement of the piston upon any initial loading, followed by secondary displacement of the cylinder sleeve upon further loading. As there are different oil phases beneath the piston head and the cylinder sleeve, different damping operations will be provided by the compensator through different loadings.

According to another embodiment of the present invention, the passive heave compensator has a cylinder sleeve with upstanding transverse longitudinal side walls forming an upstanding inner cylinder for the piston head, and a first oil phase below the piston head and above the cylinder sleeve in fluid communication with the first accumulator, and a second oil phase below the cylinder sleeve and in fluid communication either with the same accumulator as the first oil phase, or optionally with a separate accumulator.

The operation and alternatives and advantages of this embodiment are similar to those as described herein above.

According to another embodiment of the present invention, the passive heave compensator has a cylinder sleeve with upstanding transverse longitudinal side walls forming an upstanding inner cylinder for the piston head, and a single oil phase below the piston head and cylinder sleeve in fluid communication with a single accumulator.

Such embodiment provides a first damping operation by movement of the piston head along the inner cylinder, which inner cylinder has a first cross-sectional area being smaller than the cross-sectional area of the main hydraulic cylinder, followed by co-ordinated movement of the piston head and cylinder sleeve having an oil phase cross-sectional area being all of the main hydraulic cylinder, providing a second damping operation different to the first damping operation.

The terms "upper/lower" and "depending/upstanding" as used herein relate to the general use of passive heave compensators between a lifting wire or host wire connected to the 'top' of the main hydraulic cylinder, and a load being attached to the free end of the piston rod extending below the 'bottom' of the main hydraulic cylinder. Where the passive heave compensator may be used in other orientations, the terms "upper/lower" etc. can be orientated appropriately. The terms "upper/lower" etc. are not limiting to the present invention, but are used in their expected sense to the skilled man in the general use of passive heave compensators known in the art.

In a second aspect of the present invention, there is provided a passive heave compensator comprising:
  a main hydraulic cylinder, including a moveable piston having a piston rod extendible through the main hydraulic cylinder and a piston head, a gas phase above the piston head, and at least one oil phase below the piston head separated by a boundary;
  an upper connection point associated with the main hydraulic cylinder and a lower connection point associated with the piston rod; and
  at least one accumulator, the or each accumulator having a moveable separator to divide the accumulator between a gas phase above the separator, and an oil phase below the separator, and the or each oil phase being in communication with an oil phase in the main hydraulic cylinder;
  characterized in that the cross-section of the boundary changes depending upon the position of the piston head along the length of the main hydraulic cylinder.

Alternatively, characterized in that the cross-sectional area of the oil phase is variable along the length of the main hydraulic cylinder.

In particular, the oil/gas boundary is variable depending on the position of the piston head in relation to the cylinder sleeve, the cylinder sleeve position in the main hydraulic cylinder, and/or the extent to which the cylinder sleeve is forming the boundary in coordination with the piston head.

Optionally, in the passive heave compensator as described above, the main hydraulic cylinder further comprises a cylinder sleeve co-axial with the piston head wherein the piston head provides a first oil phase having a first cross-sectional area, and the cylinder sleeve provides a second oil phase having a second cross-sectional area.

Optionally, in the passive heave compensator described above, the co-ordination of the cylinder sleeve and the piston head provides a third oil phase with a third cross-sectional area.

Optionally, each oil phase is in fluid communication with a separate accumulator.

According to a third aspect of the present invention, there is provided a method of providing variable compensation to a passive heave compensator as described herein, comprising the steps of:
  (a) providing loading to the passive heave compensator through the lower connection point;
  (b) displacing oil in at least one oil phase from the main hydraulic cylinder to at least one accumulator by displacement of at least one of the cylinder sleeve, the piston head or both.

According to another embodiment of the present invention, there is provided a passive heave compensator comprising:
  a main hydraulic cylinder having an upper end and a lower end;
  a first connector means mounted at the upper end of the main hydraulic cylinder for connecting the main hydraulic cylinder to a load-lifting line;
  a moveable piston located within the main hydraulic cylinder for reciprocal motion therein, and having a piston rod extendible through the lower end of the main hydraulic cylinder, and having a piston head;
  a second connection point mounted at the lower end of the piston rod outside of the main hydraulic cylinder, for connecting the piston to a load;
  a gas phase in the main hydraulic cylinder between the piston head and the upper end of the main hydraulic cylinder;

at least one oil phase below the piston head and above the lower end of the main hydraulic cylinder separated by an oil/gas boundary;

at least one accumulator in fluid communication with the main hydraulic cylinder;

a separator for reciprocal movement in the accumulator;

a gas phase in the accumulator above the separator;

an oil phase in the accumulator below the separator, said oil phase being in communication with the oil phase in the main hydraulic cylinder via the fluid communication; and a cylinder sleeve in the main hydraulic cylinder being co-axial with piston head to provide, in co-ordination with the piston head, the boundary between the gas phase and at least one oil phase in the main hydraulic cylinder.

BRIEF DESCRIPTION OF THE DRAWINGS

Embodiments of the present invention will now be described by way of example only and with reference to the accompanying drawings in which.

DESCRIPTION OF PREFERRED EMBODIMENTS

Referring to the drawings, FIG. 1 is discussed herein above, showing an example of a prior art passive heave compensator 1 having a main hydraulic cylinder 2 and an accompanying accumulator 14. The first oil portion 12 in the main hydraulic cylinder 2 is in fluid communication via the passageway 22 with the second oil portion 20 in the accumulator 14. In this way, variation of the load or loading on the free end of the piston rod 6 (via the lower connection point) can be dampened through the passive heave compensator 1 (to the lifting wire or like attached to the upper connection point), by compression of the oil in the first oil portion 12, and the damping compensation action of the first gas portion 10 and the second gas portion 18 on the oil in the first and second oil portions 12 and 20.

The compensation is generally only optimised for one use of: to catch slack wire, reduce vertical displacement and thus landing speed of a load, absorb peak loads, reduce or avoid resonance, protect from overload, or to achieve controlled retrieval of subsea equipment; for a pre-determined load setting. The manufacturer or operator of the passive heave compensator 1 is aware of the expected load to be applied, and the expected conditions of use of the passive heave compensator 1, such that the volumes and pressures of the first and second oil and gas portions 10, 12, 18, 20 are adapted to achieve a damping operation in the expected use, within the expected loading limits, and within an expected or desired displacement of the piston 4 within the main hydraulic cylinder 2.

For example, the user may wish the piston rod 6 only to extend by 30% or 50% or 80% of its length beyond the main hydraulic cylinder 2, and for expected 'light loads', the oil and gas pressures can be set accordingly. However, once the oil and gas pressures are set, they cannot be adjusted at all during operation, and only slightly 'topside', to allow the passive heave compensator 1 to be used in different conditions, or for different loads, or in different locations, etc. Thus, such prior art passive heave compensators can only be used for one pre-defined range of conditions.

Figure 2:
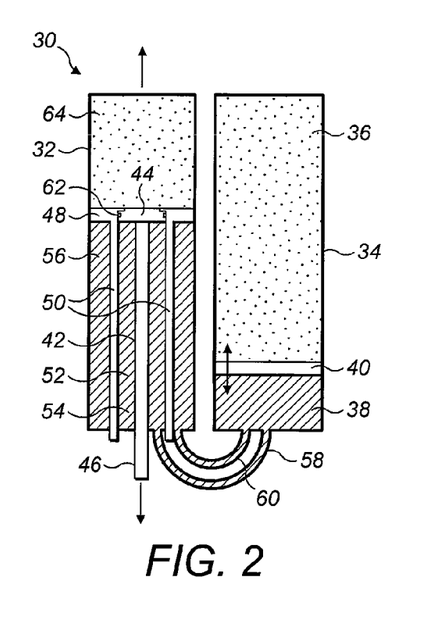
FIG. 2 is a cross-sectional schematic view of a first passive heave compensator embodiment of the present invention.

FIG. 2 shows a first passive heave compensator 30 of the present invention. The first passive heave compensator 30 has a main hydraulic cylinder 32 and an accumulator 34. The accumulator 34 has a gas phase 36 and an oil phase 38, separated by a moveable separator 40.

The main hydraulic cylinder 32 has a piston 42 having a piston head 44 and piston rod 46 extending beyond the lower end or base of the hydraulic cylinder 32. Also in the main hydraulic cylinder 32 is a cylinder sleeve 48 with depending transverse longitudinal side walls 50 forming an inner cylinder 52 for the piston head 44. Beneath the piston head 44 and within the inner cylinder 52 is a first oil phase 54: between the side walls 50 and the inner wall of the main hydraulic cylinder 32 below the cylinder sleeve 48 is a separate second oil phase 56.

The first oil phase 54 is connected by a first passageway 58 to the oil phase 38 of the accumulator 34. The second oil phase 56 is connected to the oil phase 38 of the accumulator 34 via a second fluid passageway 60. The cylinder sleeve 48 and piston head 44 provide, in co-ordination, the gas phase 64 in the main hydraulic cylinder 32.

FIG. 2 shows the piston 42 in a 'fully retracted' position in the main hydraulic cylinder 32. In a first use, the piston head 44 and the sleeve 48 could be engaged, optionally locked together, to provide the oil/gas boundary and a damping operation based on the compression of both the first and second oil phases 52, 56 together by variation of the load on the piston rod 46. As the sleeve 48 and piston head 44 are locked together, the passive heave compensator 30 can be used under or for a first defined set of conditions and/or loading.

However, by unlocking or disengaging or otherwise separating the piston head 44 from the sleeve 48, the piston head 44 is then free to move separately from the sleeve 48. Thus, the same displacement of the piston rod 46 beyond the lower end of the passive heave compensator 30 could be used for lighter loads or lighter conditions, with the accumulator 34 only having to accommodate variation of the first oil phase 54 in the inner cylinder 52 based on movement of the piston head 44 only within the inner cylinder 52.

Figure 3A:
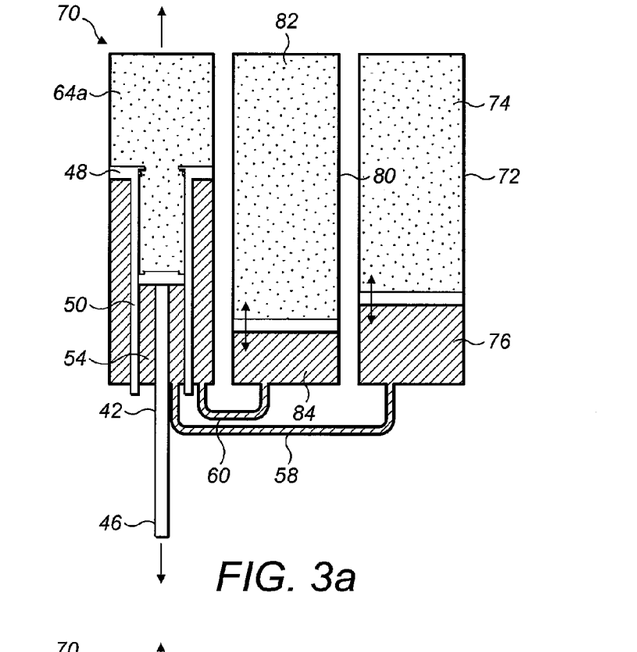
FIGS. 3a and 3b are cross-sectional schematic views of a second passive heave compensator embodiment of the present invention.
Figure 3B:
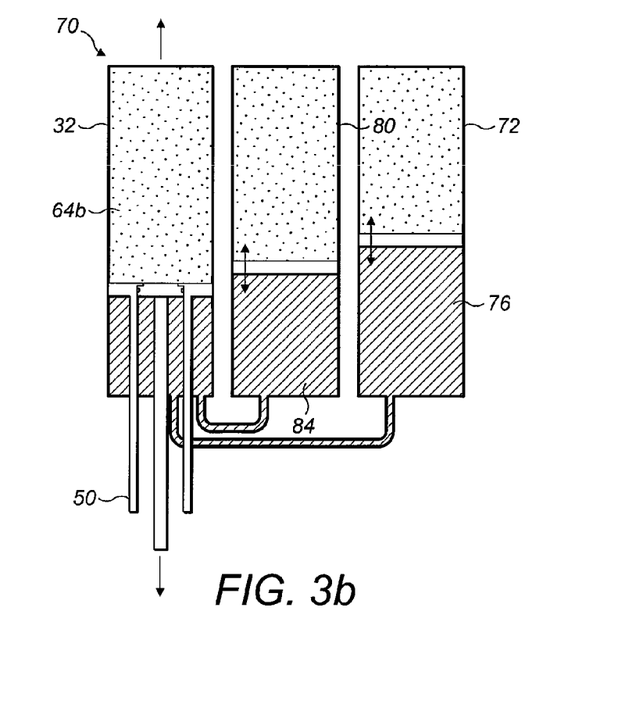

FIGS. 3a and 3b show a second passive heave compensator 70 of the present invention, being a variation of the first passive heave compensator 30 shown in FIG. 2. For ease of reference, the same reference numerals are used in FIGS. 3a and 3b as in FIG. 2 where the same or similar items or features apply.

Thus, FIG. 3a has a piston 42 longitudinally moveable or displaceable along an inner cylinder 52 formed by depending walls 50 of a cylinder sleeve 48, and which together form an oil/gas boundary having a different cross-section than in FIG. 2.

However, in a first variation compared with FIG. 2, the first oil phase 54 in the inner cylinder 52 is connected to a first accumulator 72 having a gas phase 74 and an oil phase 76. Meanwhile, the second oil phase 56 is connected via the second passageway 60 to a second accumulator 80 having a gas phase 82 and an oil phase 84.

In a first arrangement for the second passive heave compensator 70, the parameters of the oil and gas phases 74, 76 in the first accumulator 72 are different to the parameters of the gas and oil phases 82, 84 in the second accumulator 80. Such variable parameters include pressures and/or volumes of the phases, as well as the dimensions or other fluid control or fluid flow within the passageways 58 and 60.

FIG. 3a shows movement of the piston 42 downwardly relative to the cylinder sleeve 48, to provide a first damping operation to a load attached to the piston rod 46 of the piston 42. This provides a first gas phase 64a in the main hydraulic cylinder 32. When heavier damping is required, FIG. 3b shows the coordination of the piston head 44 and cylinder sleeve 48 to provide coordinated movement downwardly, thus requiring the compression of both the first and second oil phases 54, 56 together with a constant oil/gas boundary. This provides a different second gas phase 64b in the main hydraulic cylinder 32.

Figure 4A:
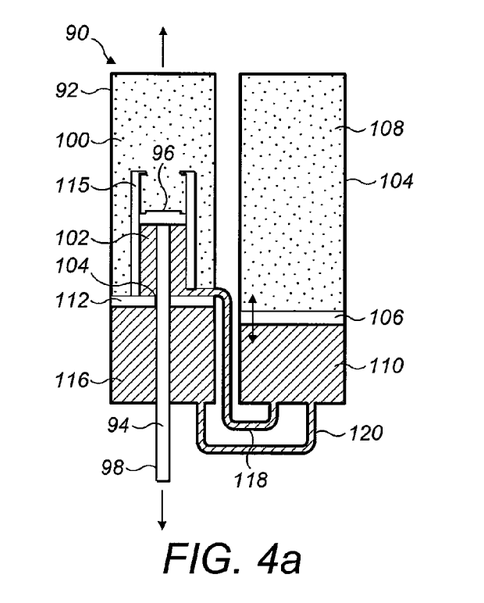
FIGS. 4a and 4b are cross-sectional schematic views of a third passive heave compensator embodiment of the present invention.

FIG. 4a shows a third passive heave compensator 90 according to the present invention. The third compensator 90 has a main hydraulic cylinder 92 including a moveable piston 94 having a piston rod 98 extending through the main hydraulic cylinder 92, and a piston head 96. Above the piston head 96 is a first gas phase 100, and below the piston head 96 is a first oil phase 102.

As before, there is an upper connection point (not shown) associated with the main hydraulic cylinder 90, and a lower connection point (not shown) associated with the piston rod 98.

FIG. 4a shows a first accumulator 104 having a moveable separator 106 to divide the accumulator 104 between a gas phase 108 above the separator 106, and an oil phase 110 beneath the separator 106.

The third compensator 90 includes a cylinder sleeve 112 co-axial with the piston head 96 to provide, in coordination with the piston head 96, the gas phase 100 and a first oil phase 102 in the main hydraulic cylinder 90.

The cylinder sleeve 112 extends across the cross-section of the main hydraulic cylinder 92, and has a collar 114 to allow movement of the piston 94 therethrough. However, the collar 114 provides a sufficient seal around the piston 94 so that the first oil phase 102 is separate from a second oil phase 116 below the cylinder sleeve 112 down to the lower end of the main hydraulic cylinder 92.

FIG. 4a shows the first oil phase 102 having a first fluid passageway 118 with the oil phase 110 of the first accumulator 104; and the second oil phase 116 being in a second fluid communication via a second passageway 120 with the oil phase 110 of the accumulator 104.

In this way, variation of the load at the end of the piston rod 98 causes movement or displacement of the piston head 96 within the upstanding inner cylinder 115, for the dimensions or volume of the first oil phase 102 only, which impacts upon the oil phase 110 in the first accumulator 104, and hence impacts the second oil phase 116 via the second passageway 120. Such an arrangement can be used for 'lighter loads'.

Figure 4B:
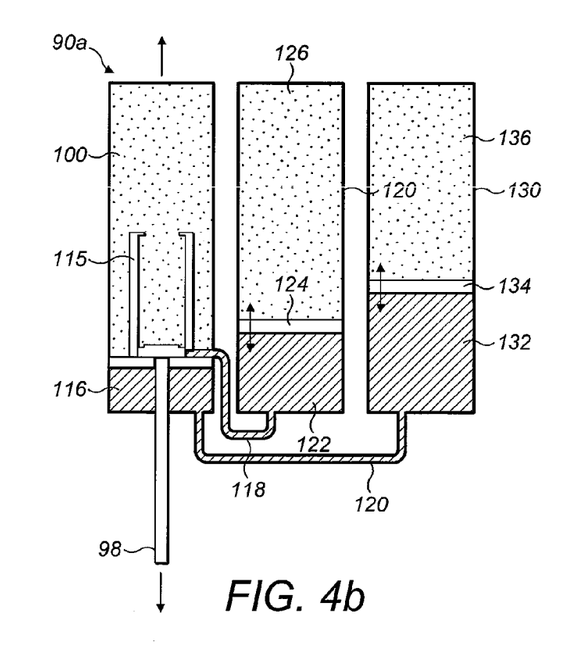

FIG. 4b shows a variation 90a of the third passive heave compensator 90 of FIG. 4a, having a first accumulator 120 and a second accumulator 130. In the arrangement of FIG. 4b, the first oil phase 102 below the piston head 96 is in fluid communication via passageway 118 with the oil phase 122 of the first accumulator 120, having a separator 124 and a gas phase 126 thereabove. Similarly, the second oil phase 116 and the main hydraulic cylinder 90 below the cylinder sleeve 112 is connected via the second fluid passageway 120 to an oil phase 132 of the second accumulator 130, having a separator 134 and a gas phase 136 thereabove.

In this way, further loading on the piston rod 98 causes both the piston head 96 and the sleeve 112 to be displaced in coordination, providing a greater damping effect or operation based on the oil compression now extending across the full cross-sectional area of the main hydraulic cylinder 92. Additionally/alternatively, the oil and gas phases in the first and second accumulators 120, 130 have different parameters, so as to provide different dampening operations on the different oil phases on the main hydraulic cylinder 92.

Figure 5A:
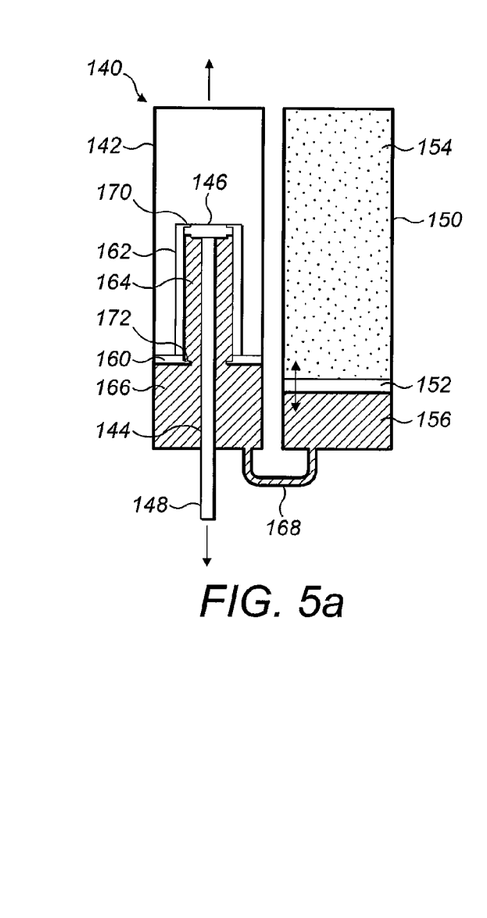
FIGS. 5a, 5b and 5c are cross-sectional schematic views of a fourth passive heave compensator embodiment of the present invention.
Figure 5B:
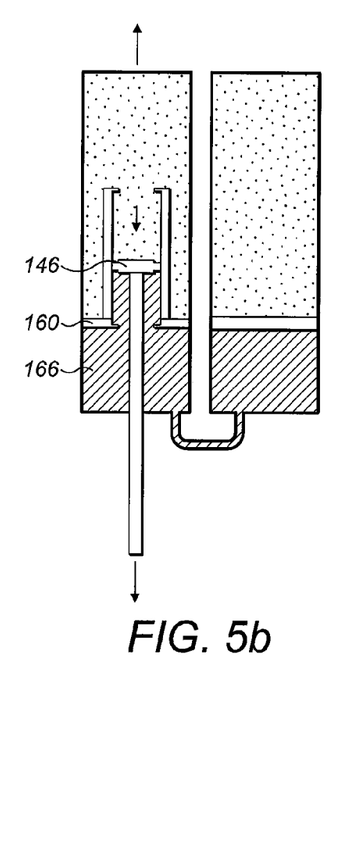
Figure 5C:
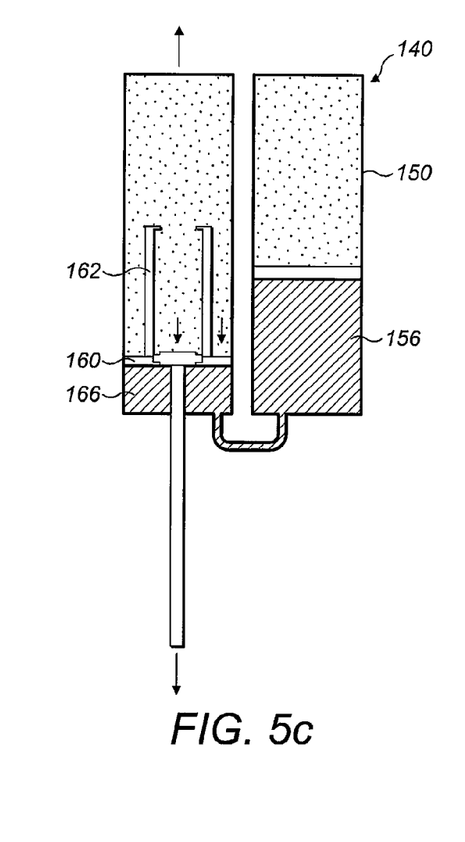

FIGS. 5a, 5b and 5c show a fourth passive heave compensator 140. The fourth compensator 140 has a main hydraulic cylinder 142, a moveable piston 144 having a piston head 146 and a piston rod 148. An accumulator 150 has a separator 152 to divide the accumulator 150 between a gas phase 154 and an oil phase 156.

The fourth compensator 140 includes a cylinder sleeve 160 having upstanding transverse longitudinal side walls 162 forming an upstanding inner cylinder 164 for the piston head 146 to move therealong or therewithin.

The sleeve 160 does not extend across the cross-sectional area of the main hydraulic cylinder 142, such that there is free passage for oil within the first oil phase 166 being below the piston head 146 in the inner cylinder 164 or within the area of the main hydraulic cylinder 142 below the cylinder sleeve 160. The first oil phase 166 is connected to the oil phase 156 in the accumulator 150 via a fluid passageway 168.

FIG. 5a shows the piston 144 in a fully retracted position, wherein the piston head 146 is nested against an inner shelf 170 at the top of the side walls 162. Upon a first loading on the piston rod 148, downward movement or displacement of the piston head 146 within the inner cylinder 164 requires compression of oil in the first oil phase 166 based on the cross-sectional area of the inner cylinder 164. When the piston head 146 reaches and is in line with the cylinder sleeve 160, it rests against the second inner shelf 172 around the inner part of the cylinder sleeve 160, such that further loading, in particular further heavier loading on the piston rod 148 now requires the compression of oil in the first oil phase 166 across the full cross-sectional area of the main hydraulic cylinder 142, as shown in FIG. 5c. Reduction of loading on the piston rod 148 reverses the motions shown in FIGS. 5c, 5b and back to FIG. 5a.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A passive heave compensator comprising:
   a main hydraulic cylinder, including a moveable piston having a piston rod extendible through the main hydraulic cylinder and a piston head, a gas phase above the piston head, and at least one oil phase below the piston head separated by a boundary;
   an upper connection point associated with the main hydraulic cylinder and a lower connection point associated with the piston rod; and
   at least one accumulator, the or each accumulator having a moveable separator to divide the accumulator between a gas phase above the separator, and an oil phase below the separator, and the or each oil phase being in communication with an oil phase in the main hydraulic cylinder;
   wherein the main hydraulic cylinder further comprises a cylinder sleeve co-axial with the piston head to provide, in co-ordination with the piston head, the boundary between the gas phase and the at least one oil phase in the main hydraulic cylinder, and wherein the main hydraulic cylinder has a first oil phase below the piston head and a second oil phase below the cylinder sleeve.

2. A passive heave compensator as claimed in claim 1, wherein the cylinder sleeve is moveable.

3. A passive heave compensator as claimed in claim 2, wherein the cylinder sleeve is at least in part moveable in line with movement of the piston head.

4. A passive heave compensator as claimed in claim 1, wherein the first and second oil phases are in fluid communication.

5. A passive heave compensator as claimed in claim 1, wherein the first and second oil phases are separate.

6. A passive heave compensator as claimed in claim 1, wherein each oil phase in the main hydraulic cylinder is in fluid communication with a separate accumulator.

7. A passive heave compensator as claimed in claim 6, wherein each accumulator provides a different compensation to the main hydraulic cylinder.

8. A passive heave compensator as claimed in claim 1, wherein the piston head and cylinder sleeve provide multi-step compensation to the compensator.

9. A passive heave compensator as claimed in claim 1, wherein the cylinder sleeve has transverse longitudinal side walls forming an inner cylinder for the piston head.

10. A passive heave compensator as claimed in claim 1, wherein the piston head and cylinder sleeve have different displacements within the main hydraulic cylinder.

11. A passive heave compensator comprising:
a main hydraulic cylinder, including a moveable piston having a piston rod extendible through the main hydraulic cylinder and a piston head, a gas phase above the piston head, and at least one oil phase below the piston head separated by a boundary;
an upper connection point associated with the main hydraulic cylinder and a lower connection point associated with the piston rod; and
at least one accumulator, the or each accumulator having a moveable separator to divide the accumulator between a gas phase above the separator, and an oil phase below the separator, and the or each oil phase being in communication with an oil phase in the main hydraulic cylinder;
wherein the main hydraulic cylinder further comprises a cylinder sleeve co-axial with the piston head to provide, in co-ordination with the piston head, the boundary between the gas phase and the at least one oil phase in the main hydraulic cylinder, and wherein the cylinder sleeve with depending transverse longitudinal side walls form an inner cylinder for the piston head to provide a first oil phase below the piston head and a second oil phase defined by the cylinder sleeve side walls and inner wall of the main hydraulic cylinder.

12. A passive heave compensator comprising:
a main hydraulic cylinder, including a moveable piston having a piston rod extendible through the main hydraulic cylinder and a piston head, a gas phase above the piston head, and at least one oil phase below the piston head separated by a boundary;
an upper connection point associated with the main hydraulic cylinder and a lower connection point associated with the piston rod; and
at least one accumulator, the or each accumulator having a moveable separator to divide the accumulator between a gas phase above the separator, and an oil phase below the separator, and the or each oil phase being in communication with an oil phase in the main hydraulic cylinder;
wherein the main hydraulic cylinder further comprises a cylinder sleeve co-axial with the piston head to provide, in co-ordination with the piston head, the boundary between the gas phase and the at least one oil phase in the main hydraulic cylinder, and wherein the cylinder sleeve with upstanding transverse longitudinal side walls form an upstanding inner cylinder for the piston head, and a first oil phase below the piston head and above the cylinder sleeve in fluid communication with the first accumulator, and a second oil phase below the cylinder sleeve and in fluid communication either with the same accumulator as the first oil phase, or with a separate accumulator.

13. A passive heave compensator as claimed in claim 1, having the cylinder sleeve with upstanding transverse longitudinal side walls forming an upstanding inner cylinder for the piston head, and a single oil phase below the piston head and cylinder sleeve in fluid communication with the accumulator.

14. A passive heave compensator comprising:
a main hydraulic cylinder, including a moveable piston having a piston rod extendible through the main hydraulic cylinder and a piston head, a gas phase above the piston head, and at least one oil phase below the piston head separated by a boundary;
an upper connection point associated with the main hydraulic cylinder and a lower connection point associated with the piston rod; and
at least one accumulator, the or each accumulator having a moveable separator to divide the accumulator between a gas phase above the separator, and an oil phase below the separator, and the or each oil phase being in communication with an oil phase in the main hydraulic cylinder;
wherein the cross-section of the boundary changes depending upon the position of the piston head along the length of the main hydraulic cylinder, and wherein the main hydraulic cylinder further comprises a cylinder sleeve co-axial with the piston head wherein the piston head provides a first oil phase having a first cross-sectional area, and the cylinder sleeve provides a second oil phase having a second cross-sectional area.

15. A passive heave compensator as claimed in claim 14, wherein the coordination of the cylinder sleeve and the piston head provides a third oil phase with a third cross-sectional area.

16. A passive heave compensator as claimed in claim 14, wherein each oil phase is in fluid communication with a separate accumulator.

17. A method of providing variable compensation to a passive heave compensator as defined in claim 1, comprising the steps of:
(a) providing loading to the passive heave compensator through the lower connection point;
(b) displacing oil in at least one oil phase from the main hydraulic cylinder to at least one accumulator by displacement of at least one of the cylinder sleeve, piston head, or both.

* * * * *